US008373569B2

(12) United States Patent
Gilpatrick

(10) Patent No.: US 8,373,569 B2
(45) Date of Patent: Feb. 12, 2013

(54) POWER LINE CARRIER (PLC) COMMUNICATION OF STANDBY GENERATOR STATUS

(75) Inventor: Richard J. Gilpatrick, Whitewater, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 308 days.

(21) Appl. No.: 12/788,471

(22) Filed: May 27, 2010

(65) Prior Publication Data

US 2011/0291847 A1    Dec. 1, 2011

(51) Int. Cl.
  *G08B 21/00*    (2006.01)
(52) U.S. Cl. ........ 340/657; 340/661; 340/662; 340/663; 340/691.6; 340/4.21; 340/12.33; 340/12.37; 290/28; 290/32; 290/40 B; 290/44; 290/46; 324/76.39; 324/126; 324/520; 361/42; 361/64; 361/93.1
(58) Field of Classification Search .................. 340/657, 340/661, 662, 663, 691.6, 310.12, 310.16, 340/4.21, 12.33, 12.37; 290/28, 32, 40 B, 290/44, 46; 324/76.39, 126, 520; 361/42, 361/64, 93.1
See application file for complete search history.

(56) References Cited

U.S. PATENT DOCUMENTS

| | | | |
|---|---|---|---|
| 4,189,713 A | 2/1980 | Duffy | |
| 4,200,862 A | 4/1980 | Campbell et al. | |
| 7,015,599 B2 | 3/2006 | Gull et al. | |
| 7,053,497 B2 | 5/2006 | Sodemann et al. | |
| 7,104,847 B2 | 9/2006 | Sodemann et al. | |
| 7,161,253 B2 | 1/2007 | Sodemann et al. | |
| 7,356,384 B2 | 4/2008 | Gull et al. | |
| 7,471,505 B2 | 12/2008 | Gull et al. | |
| 2003/0085621 A1* | 5/2003 | Potega | 307/18 |
| 2011/0175597 A1* | 7/2011 | Stair et al. | 324/126 |

OTHER PUBLICATIONS

Statstation™ Power Monitoring System, Briggs & Stratton Corporation, Installation & Operator's Manual, Wireless StatStation™, Dec. 13, 2006.

* cited by examiner

*Primary Examiner* — Tai T Nguyen
(74) *Attorney, Agent, or Firm* — Andrus, Sceales, Starke & Sawall, LLP

(57) ABSTRACT

A method and system for remotely monitoring the status of a standby generator. The system includes a PLC transmitter in communication with the control unit for the generator. The PLC transmitter receives error codes from the control unit of the generator and transmits encoded error codes over the power distribution network in a home using a PLC frequency. A remote status display device can be connected to the power distribution network in the home at any convenient location. The remote status display device includes a PLC receiver that decodes the error codes. The decoded error codes are displayed on a display of the remote status display device for viewing by the home occupant at a location remote from the standby generator.

18 Claims, 5 Drawing Sheets

POWER LINE CARRIER (PLC) COMMUNICATION OF STANDBY GENERATOR STATUS

BACKGROUND OF THE INVENTION

The present disclosure generally relates to a system and method for monitoring the status of a standby generator. More specifically, the present disclosure relates to a method and system for remotely monitoring the status of a standby generator through a display device connected to the power distribution network of a home through any one of a plurality of electrical outlets.

When there is a residential power outage, backup power may be provided to a residence by a standby generator. In some cases, the standby generator is started automatically after detection of the power outage. A standby generator that is started automatically usually requires an automatic transfer switch to connect electrical loads within the residence to the generator rather than to the power supply in the home. A combination of a standby generator and an automatic transfer switch is generally installed in the residence by trained personnel.

Since standby generators may need to run for an extended period of time during a power outage, standby generators typically include some type of generator monitoring system. The generator monitoring system is equipped with sensors that detect operating conditions of the standby generator and shut down the generator in the event of potentially damaging conditions, such as low oil pressure, high engine temperature, engine overspeed and other fault conditions.

In currently available systems, when the generator is shut down due to a sensed fault condition, the standby generator generates an error code at the generator that provides an indication of the reason for the generator shutdown. Since standby generators are located outside of the residence, the home occupant must go outside and check the error codes to determine why the generator shut down. In bad weather conditions, such steps are not desirable.

SUMMARY OF THE INVENTION

The present disclosure relates to a system and method for remotely monitoring the status of a standby generator through one or more display devices connected to the power distribution network of a home. The system includes a control unit contained within the standby generator for monitoring the status of the standby generator and generating error codes upon detection of fault conditions associated with the generator. The error codes generated by the control unit are received by a power line carrier (PLC) transmitter. When the PLC transmitter receives the error codes from the control unit, the PLC transmitter encodes the error codes for transmission at a PLC frequency. In one embodiment of the disclosure, the PLC transmitter utilizes X10 PLC transmission techniques to encode the error codes from the control unit of the standby generator for transmission at the PLC frequency. The PLC frequency preferably ranges between 120 kHz and 400 kHz. In one embodiment, the PLC frequency is 200 kHz.

The error codes transmitted by the PLC transmitter can be detected at any point along the power distribution network in the home. In accordance with the present disclosure, a remote status display device is removably connected to the power distribution network through an electrical outlet. The remote status display device includes a PLC receiver that is operable to receive the error code transmitted at the PLC frequency. The PLC receiver decodes the error code and the decoded error code is displayed on the remote status display device. Since the remote status display device can be connected to any electrical outlet, a homeowner can selectively position the remote status display device in a desired location without requiring dedicated wiring within the home.

In one embodiment of the disclosure, the PLC transmitter and the PLC receiver are configured to have a common address such that the PLC transmitter and the PLC receiver are able to communicate with each other. The unique address can be assigned utilizing either an address switch associated with each of the devices or through a software code transmitted from the PLC transmitter and received by the PLC receiver.

The system of the present disclosure is configured such that the control unit of the generator not only transmits error codes but also transmits a positive test result code when the standby generator passes the test exercises. The positive test result code is received by the remote status display device and displayed as an "OK" indicator. The "OK" indicator allows the home occupant to have the peace-of-mind that the standby generator is ready for operation should power be disrupted.

The remote status display device includes an internal power supply and internal memory such that when the remote status display device is disconnected from the power distribution network, the remote status display device maintains the most recent error code received. When the remote status display device is reconnected to the power distribution network, the remote status display device again shows the most recent error code.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
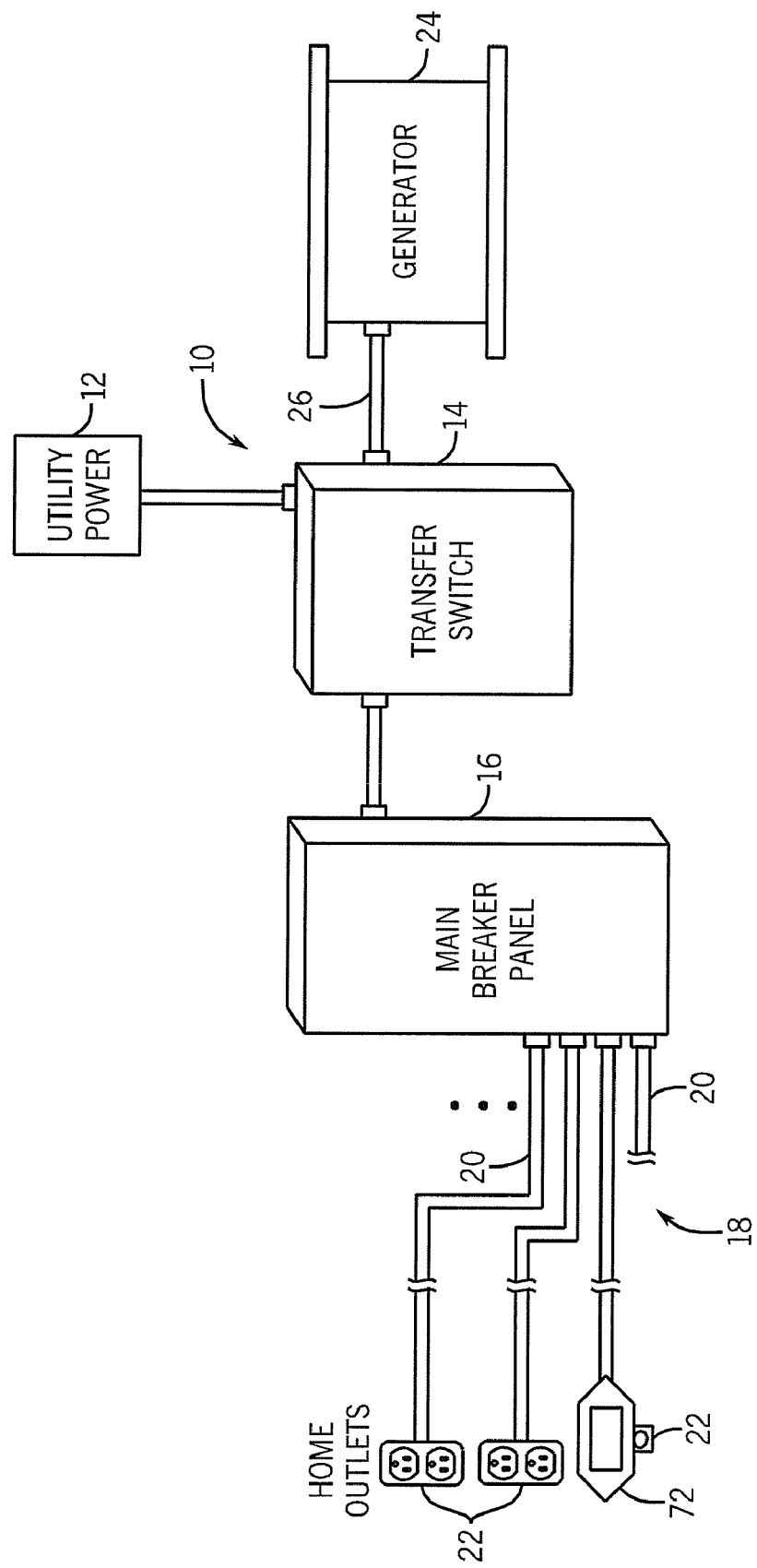
FIG. 1 is a schematic illustration of a residential electrical system having a standby generator.

FIG. 1 depicts a load management system 10 used in a residence. The load management system 10 includes a connection to a main power supply 12. The power supply 12 is fed into a transfer switch 14. The transfer switch 14 carries out a series of functions, as will be described below, and can also be referred to as a load management controller.

The transfer switch 14 feeds electrical power to a main breaker panel 16 for the residence. The main breaker panel 16 in turn is connected to the power distribution network 18 of the home. The power distribution network 18 includes a series of individual circuits 20. In the embodiment shown in FIG. 1, each of the electrical circuits 20 includes one or more electrical outlets 22. The electrical outlets 22 can receive a plug from any one of a plurality of different electrical loads positioned within the home. The power distribution network 18 is schematically illustrated in FIG. 1 and it should be understood that the power distribution network can have a significantly larger number of individual electrical circuits 20 and outlets 22. Typically, the main breaker panel 16 includes a circuit breaker associated with each of the electrical circuits 20. During normal operating conditions, utility power 12 is distributed to each of the loads connected to the electrical outlets 22 through a combination of the main breaker panel 16 and the transfer switch 14. Electrical loads connected to each of the outlets 22 can include normal loads such as lights, electrical appliances, stereos or any other device that draws electrical power from the utility 12.

In the embodiment shown in FIG. 1, the transfer switch 14 is connected to a standby generator 24 through the electrical wiring 26. As is well known, when the supply of power from the utility 12 is interrupted, a control unit within the transfer switch 14 senses the interruption of power. The transfer switch 14 sends a signal to turn on the standby generator 24 and controls switches within the transfer switch 14 to direct the supply of electricity generated by the standby generator 24 to the main breaker panel 16. When the connection is made by the standby generator 24 and the main breaker panel 16, the connection between the utility power supply 12 and the main breaker panel 16 is disrupted such that electricity is supplied only by the standby generator 24.

Figure 2:
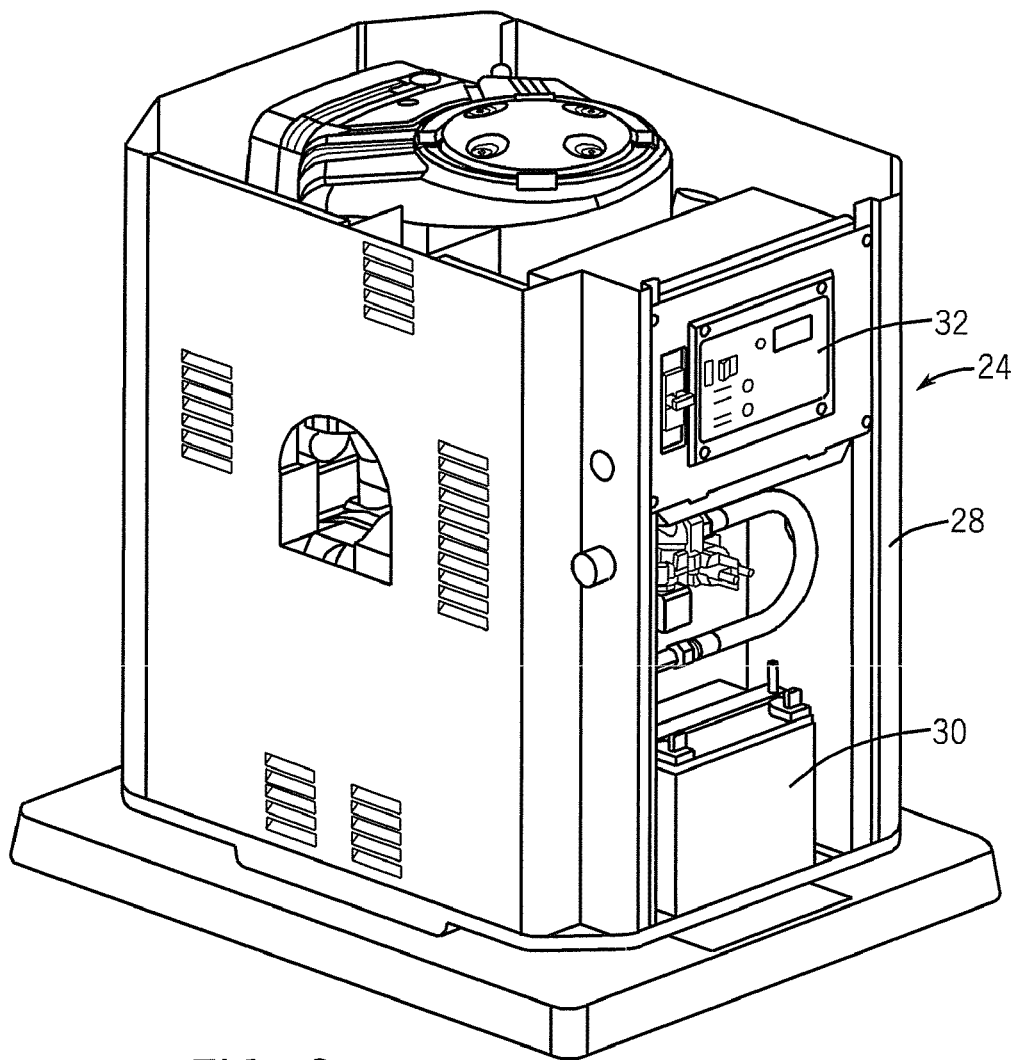
FIG. 2 is a perspective view of a standby generator.

FIG. 2 illustrates one embodiment of a standby generator 24 that can be utilized with the present disclosure. In the exemplary embodiment shown, the standby generator 24 is a 10 KW home generator system, although other standby generators could be utilized. The standby generator 24 includes an internal combustion engine that can be operated using either natural gas or liquid propane.

As illustrated in FIG. 2, the standby generator 24 includes an outer housing 28 that encloses the operating components of the standby generator, including a 12-volt DC battery 30. The battery 30 provides the required power to start the internal combustion engine.

The standby generator 24 includes a control panel 32 that allows an operator to conduct various tests, monitor the operation of the generator and perform various maintenance functions for the standby generator 24. The control panel 32 is connected to a control unit for the standby generator such that the control unit can relay messages to an owner/operator and receives input commands through the control panel 32.

Figure 3:
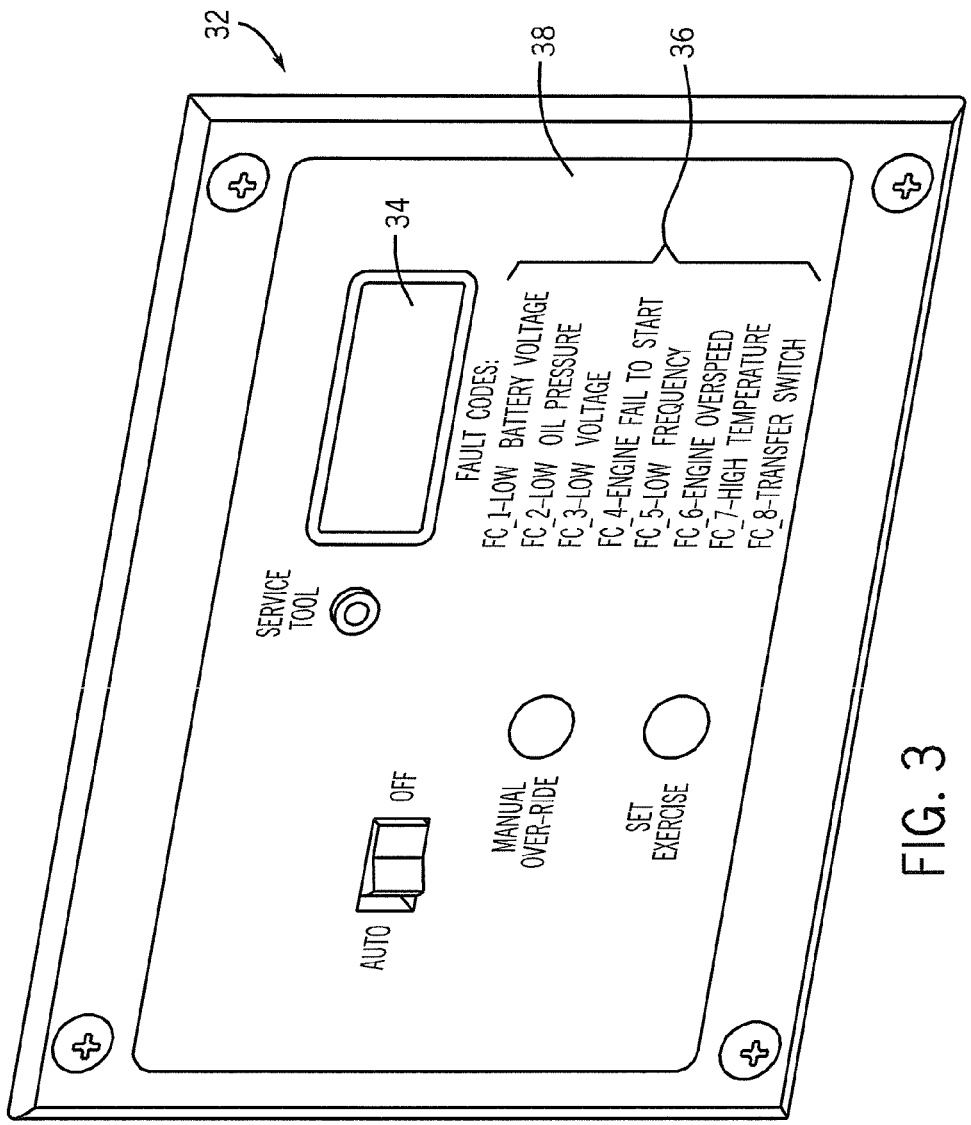
FIG. 3 is a perspective view of the display panel of the standby generator.

FIG. 3 is a magnified view of the control panel 32. The control panel 32 includes a digital display 34 that allows the control unit of the standby generator to display the total number of hours the generator has been running and various error codes. The digit display 34 is also used to schedule maintenance tasks and for troubleshooting operational problems within the standby generator. A list 36 of error codes is printed on the face surface 38 such that an operator can determine the type of fault that has occurred within the generator based upon the error code shown on the digital display 34.

As can be understood in FIGS. 2 and 3, the control panel 32 including the display 34 allows an operator/owner to determine the type of fault that caused the generator to shut down when the owner/operator is present at the generator. However, since the generator 24 is typically positioned outside the home, it is often inconvenient for the owner/operator to monitor the type of error codes that shut down the generator during bad weather conditions.

Figure 4:
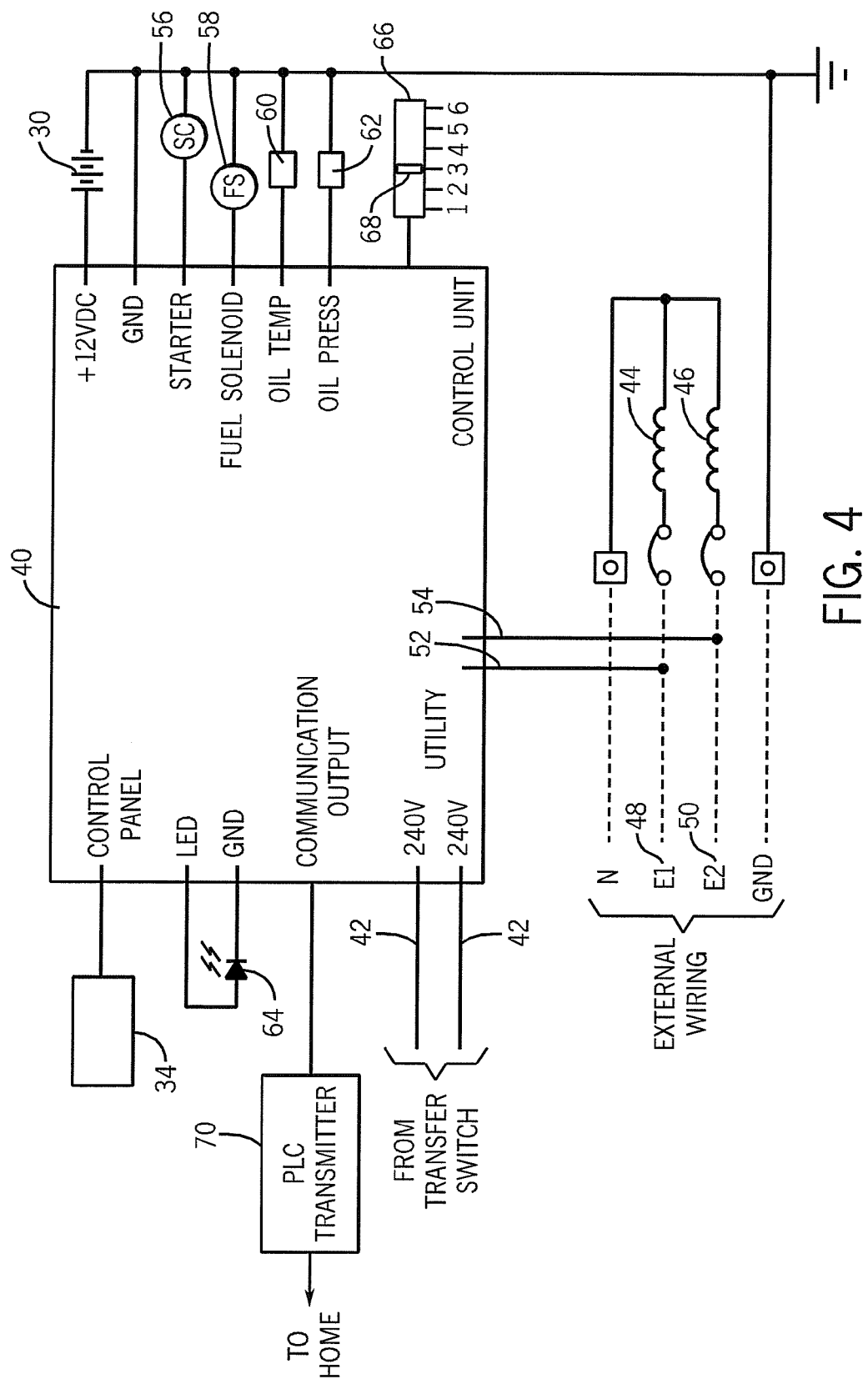
FIG. 4 is a circuit schematic illustrating the configuration of the standby generator control unit and the PLC transmitter.

FIG. 4 schematically illustrates a control unit 40 for the standby generator. The control unit 40 can be various different types of processors while operating within the scope of the present disclosure. Although a single control unit 40 is shown in FIG. 4, it should be understood that the control unit could be formed from multiple control units joined together in an operating condition.

The control unit 40 includes a series of inputs that allows the control unit 40 to sense various operating conditions of the standby generator. The control unit 40 is programmed with various operating instructions that allow the control unit 40 to control the operation of the standby generator based upon various different inputs received.

The control unit 40 includes a pair of inputs 42 from the transfer switch. The inputs 42 allow the control unit 40 to monitor the voltage from the utility. If the voltage from the utility disappears from the inputs 42, the control unit 40 determines that utility power has been disrupted and the control unit 40 begins the process of starting the standby generator.

The standby generator includes a pair of power windings 44, 46 that, when the standby generator is operating, create a voltage source at a pair of voltage outputs 48, 50. The control unit 40 monitors the voltage at each of the outputs 48, 50 through a pair of generator inputs 52, 54. Through the generator inputs 52, 54, the control unit can monitor various generator parameters, such as the generator voltage and generator frequency.

The control unit 40 monitors status of the battery 30 and controls starting of the internal combustion engine through a pair of starter contacts 56. The control unit 40 is further connected to a fuel solenoid 58, which provides another method for the control unit to control operation of the standby generator.

The control unit 40 receives an input from an oil temperature switch 60 and an oil pressure switch 62 such that the control unit can monitor both the oil temperature and the oil pressure.

The control unit 40 is connected to the display 34 such that the control unit 40 can display messages based upon the detected error conditions. In addition, the control unit 40 can also display the total number of hours the generator has been operated through the display 34.

The control unit 40 is connected to an indicator LED 64. The control unit 40 blinks the LED 64 in a pattern to indicate the type of fault that has been sensed by the control unit 40.

The various types of faults that can be detected by the control unit 40 are shown by the error codes 36 shown in FIG. 3. In the embodiment illustrated, the control unit can generate eight separate error codes, although it is contemplated that the control unit 40 could be programmed to detect various other faults depending upon the configuration of the standby generator.

Referring back to FIG. 4, an address selection switch 66 is shown connected to the control unit 40. The address selection switch 66 includes six specific positions for a switch member 68. The owner/operator can selectively position the switch member 68 in one of the six positions to assign one of six unique addresses to the control unit 40.

As illustrated in FIG. 4, the control unit 40 is in communication with a power line carrier (PLC) transmitter 70. In the embodiment shown in FIG. 4, the PLC transmitter 70 is shown as a separate circuit board that is in communication with the control unit 40. It is contemplated that the PLC transmitter 70 could be included in the transfer switch 14 shown in FIG. 1. Alternatively, the PLC transmitter 70 could be incorporated directly into the control unit 40 of the standby generator 24. In each case, the PLC transmitter 70 receives information from the control unit 40 and encodes the received information before transmitting the information to the home power distribution network.

The PLC transmitter 70 is configured to receive the error codes generated by the control unit 40. Upon receiving any one of the error codes, the PLC transmitter 70 encodes the error code and transmits the error code at a PLC frequency. The error code at the PLC frequency is transmitted from the PLC transmitter 70 to the entire power distribution network 18 in the home (FIG. 1). In this manner, the control unit 40 is able to distribute the error code to the power distribution network at the PLC frequency.

In one embodiment of the disclosure, the PLC transmitter 70 is configured to utilize X10 power line carrier (PLC) technology to transmit information relating to the error code over the power distribution network of the home. X10 power line carrier technology is a well known and developed power line carrier transmission technique that utilizes the technique of superimposing and transmitting a 120 kHz encoded signal on the 60 Hz electrical power line contained within a home. A description of the X10 technology is included in U.S. Pat. No. 4,200,862, the disclosure of which is incorporated herein by reference.

The PLC transmitter 70 utilizing X10 technology transmits a signal over the power line to a receiving device that is programmed to receive a signal at the PLC frequency of approximately 200 kHz. Utilizing X10 technology, there are 256 different codes available which allow the PLC transmitter to send the various different error codes needed for the standby generator. Although X10 technology of the present disclosure is configured to operate at approximately 200 kHz, it is contemplated that the PLC transmitter 70 could transmit the error codes at a PLC frequency above 120 kHz and below 400 kHz.

Referring back to FIG. 1, the error codes transmitted by the PLC transmitter based on the faults detected by the standby generator 24 are sent over the entire power distribution network 18 contained within a home. In the embodiment shown in FIG. 1, a remote status display device 72 is shown plugged into one of the electrical outlets 22. The remote status display device 72 is configured as a PLC receiver that can receive the encoded PLC signals and convert the encoded signals to the error codes which can then be displayed on the remote status display device 72. As can be understood in FIG. 1, the remote status display device 72 can be installed in any one of the plurality of electrical outlets 22 contained within the home, since the encoded PLC signal is transmitted along all of the wires contained within the power distribution network 18.

Figure 5:
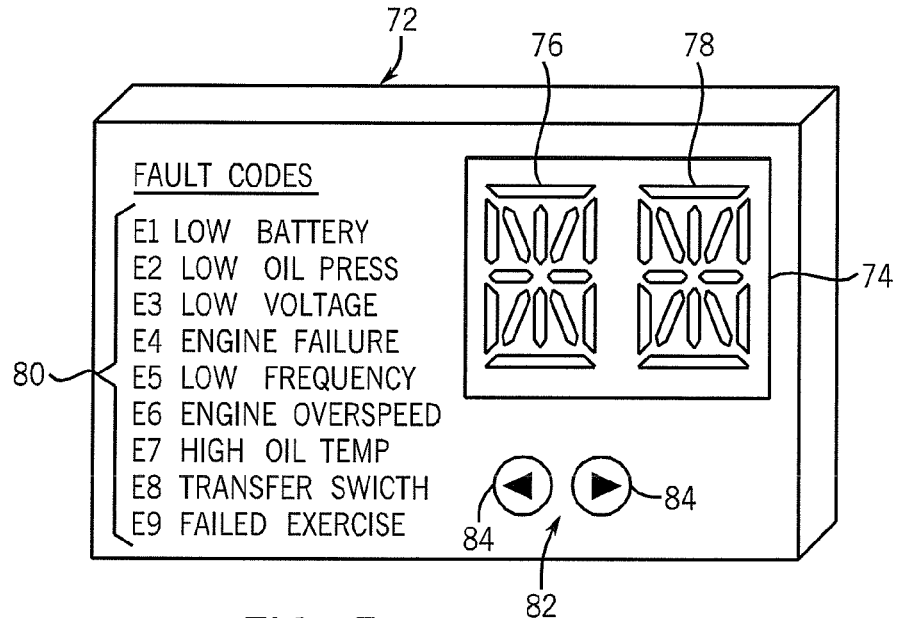
FIG. 5 is a perspective view of one embodiment of a remote status display device.

Referring now to FIG. 5, there shown is one exemplary embodiment of the remote status display device 72. Although one embodiment of the remote status display device 72 is illustrated, it should be understood that the remote status display device could have many other forms while operating within the scope of the present disclosure.

As illustrated, the remote status display device 72 includes a digital display 74. The digital display 74 includes two characters 76 and 78. In the embodiment illustrated, each of the characters 76, 78 are comprised of 14 segment LED character displays.

In addition to the digital display 74, the remote status display device 72 includes a listing 80 of the various error codes that are displayed on the display 74. In the embodiment illustrated, the error codes range from E1 to E9. Each of the error codes 80 relate to a different fault detected by the control unit 40 of the standby generator. Although nine error codes are shown in the embodiment of FIG. 5, it should be understood that a different number of error codes could be displayed depending upon the configuration of the generator control unit 40.

In the embodiment illustrated, the remote status display device 72 includes a user input device 82 that allows an owner/operator to control the display 74. In the embodiment illustrated, the user input device 82 includes a pair of buttons 84 that allow the operator to scroll between different display parameters on the digital display 74.

In addition to showing the error codes 80, it is contemplated that the digital display 74 could also display the current percentage of the load on the generator when the generator is operating. As an example, during operation of the standby generator, the display 74 may show the percentage of the maximum load on the generator. In such an embodiment, if the maximum load begins to approach 100%, the homeowner could remove loads from the power distribution network to prevent an overload condition.

Figure 6:
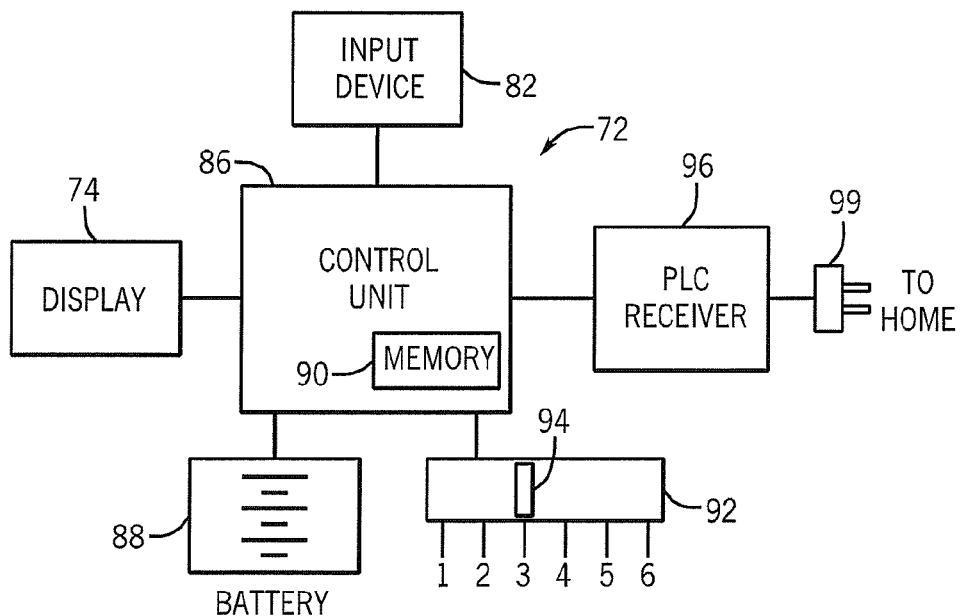
FIG. 6 is a schematic illustration of the operative components of the remote status display device.

Referring now to FIG. 6, there shown is an exemplary embodiment of the operating components contained within the remote status display device 72. The remote status display device 72 includes a control unit 86 that is coupled to the digital display 74, the user input device 82 and an internal battery 88. The control unit 86 includes an internal memory 90 that allows the control unit 86 to store error codes should the remote status display device 72 be removed from the electrical outlet. If the remote status display device 72 is removed, it is important for the device 72 to remember the last error code received such that when the device is plugged back into the power distribution network, the remote status display device 72 will again display the most recently received error code.

The remote status display device 72 further includes an address selection switch 92 having a switch member 94 that can be moved between any one of six distinct positions. The address selection switch 92 is similar to the address selection switch connected to the control unit of the standby generator. During setup of the entire load management system, the remote status display device 72 and the standby generator are configured to have the same address such that the devices can communicate with each other. Since the PLC transmitter 70 transmits error codes utilizing PLC signals, it is possible that a home located near the standby generator and also equipped with a remote status display device may receive error codes from a neighboring standby generator. The use of the address selection switches 66, 92 assign unique and common addresses between the standby generator 24 and the remote status display device 72.

Although a pair of address selection switches 66, 92 is shown in the embodiment, the unique addresses assigned to both the PLC transmitter and the PLC receiver could be carried out utilizing a unique code sent from the PLC transmitter to the PLC receiver. In such an embodiment, during installation, an installer would depress a set button either on the control unit of the generator or on the PLC transmitter circuit board. When the set button is pressed, the remote status display device would receive the transmitted code and would then be tied to the PLC transmitter. In such an embodiment, if a homeowner wanted to configure a second remote status display device, the set button on the PLC transmitter would need to be depressed to pair the second remote status display device with the PLC transmitter. In either embodiment described, the pairing of the PLC transmitter and the PLC receiver ensures that the PLC receiver receives information only from the correct transmitter.

The remote status display device 72 includes a plug 99 that allows the display device 72 to be connected to any electrical outlet in the home. The plug 99 can be incorporated into the display device 72 in many different manners and configurations.

Referring back to FIGS. 1 and 4, four different situations or scenarios are contemplated for the operation of the system of the present disclosure. In the first scenario, utility power is present and the control unit of the standby generator exercises a test sequence. If the generator passes the test sequence, the control unit generates a position test result code that is received by the PLC transmitter 70. The PLC transmitter 70 transmits the positive test result code over the PLC frequency.

When the remote status display device 72 receives the encoded positive test code, the control unit 86 of the display device 72 operates the display 74 to display the two characters "OK". When the "OK" message is shown on the display 74, the home occupant has peace-of-mind that the generator has passed the most recent test and is ready to operate should utility power be disrupted. The display 74 will continue to display the "OK" characters until the remote status display device 72 receives another error code.

In a second contemplated scenario, the utility is providing power to the home and the generator fails the test exercise. If the generator fails the exercise, the control unit of the generator may generate an error code which is transmitted using the PLC transmitter 70. When the remote status display device 72 receives the error code, the PLC receiver 96 decodes the PLC signal and the control unit 86 generates the appropriate error code.

If the generator fails the exercise, the generator may not be able to generate an error code to be displayed by the remote status display device 72. In such a situation, the remote status display device 72 determines whether the remote status display device has received a positive indication from the generator within the past seven days. If the remote status display device has not received a positive confirmation with the past seven days, the module will generate error code E9. Error code E9 indicates that the generator failed the test exercise. The control unit continues to generate the error code E9 until the remote status display device 72 receives a signal from the generator indicating that either the exercise was successful or a different fault condition was detected. As described previously, the battery 88 contained within the remote status display device 72 allows the error code to remain on the display 74 should the remote status display device 72 be removed from the wall outlet.

In a third scenario, the power supply from the utility is interrupted and the generator either fails to start or the transfer switch fails for some reason. In this situation, the PLC transmitter 70 generates an encoded signal that represents the error code detected by the control unit 40. When the remote status display device receives the error code, the PLC receiver 96 decodes the signal and the control unit 86 generates the appropriate error code on the display 74.

In a fourth scenario, power from the utility is interrupted and the generator starts properly but some other type of failure is detected after the generator is operating. In such a situation, the control unit 40 generates the appropriate error code and the PLC transmitter 70 encodes the error code. The encoded error code is sent out over the power distribution network where the remote status display device 72 receives the encoded signal. The remote status display device 72 then displays the error code on the display 74.

As can be understood by the above description, the PLC transmitter 70 contained within the standby generator communicates fault codes utilizing PLC encoded messages. A remote status display device can be connected to the power distribution network in the home at any location and receives the PLC encoded error codes and displays the error codes for viewing by the home occupant. In this manner, no additional external wiring is required and a wireless transmitter is not needed.

I claim:

1. A system for monitoring a status of a standby generator operable to supply electrical power to a power distribution network in a home, the system comprising:
    a control unit contained within the standby generator for monitoring the status of the standby generator and generating error codes upon detection of fault conditions;
    a power line carrier (PLC) transmitter coupled to the control unit to receive the error code and transmit the error code over the power distribution network using a PLC frequency; and
    a remote status display device connected to the power distribution network and including a PLC receiver operable to receive the error code transmitted using the PLC frequency, wherein the remote status device displays the error code.

2. The system of claim 1 wherein the power distribution network includes a plurality of electrical outlets and the remote status display device includes a plug such that the remote status display device is connectable to the power distribution network at any one of the plurality of electrical outlets.

3. The system of claim 1 wherein the remote status display device includes a user input device.

4. The system of claim 1 wherein the PLC transmitter and the PLC receiver each have a common address such that the PLC transmitter communicates only with the associated PLC receiver.

5. The system of claim 1 wherein the control unit generates a positive test result code upon a successful test of the standby generator, wherein the positive test result code is transmitted by the PLC transmitter.

6. The system of claim 5 wherein the PLC receiver receives the positive test result code and the remote status display device displays the positive test result code.

7. The system of claim 1 wherein both the control unit and the remote status display device include an address selection switch.

8. The system of claim 7 wherein the address selection switch allows one of a plurality of addresses to be assigned to each of the control unit and the remote status display device.

9. The system of claim 1 wherein the remote status display device includes an internal power supply and an internal memory such that the remote status display device retains the error codes upon disconnection from the power distribution network.

10. The system of claim 1 wherein the remote status device is removably connected to the power distribution network.

11. The system of claim 1 wherein the PLC frequency is between 120 kHz and 400 kHz.

12. A method of remotely monitoring a status of a standby generator operable to supply electrical power to a power distribution network in a home, the method comprising:
    monitoring the status of the standby generator with a control unit of the standby generator;
    generating an error code upon detection of a fault condition associated with the standby generator;
    transmitting the error code over the power distribution network of the home at a power line carrier (PLC) frequency;
    connecting a remote status display device to the power distribution network of the home;
    receiving and converting the error code in a PLC receiver of the remote status display device; and displaying the error code on a display of the remote status display device.

13. The method of claim 12 wherein the remote status display device is removably coupled to any one of a plurality of electrical outlets of the power distribution network.

14. The method of claim 12 further comprising the steps of:

testing the operation of the standby generator;

transmitting a positive test result code over the power distribution network at the PLC frequency; and displaying the positive test result code on the display of the remote status display device.

15. The method of claim 10 wherein the error code generated by the control unit is received by a PLC transmitter and transmitted at the PLC frequency.

16. The method of claim 15 further comprising the step of assigning a common address to the PLC transmitter and the PLC receiver.

17. The method of claim 16 wherein the step of assigning the common address includes adjusting the position of an address selection switch contained on both the control unit and the remote status display device.

18. The method of claim 12 wherein the PLC frequency is between 120 kHz and 400 kHz.

* * * * *